United States Patent [19]
Lehmann

[11] Patent Number: 6,123,771
[45] Date of Patent: Sep. 26, 2000

[54] DEVICE FOR APPLYING ADHESIVE SPOTS ON A SUBSTRATE

[75] Inventor: Manfred Lehmann, Cologne, Germany

[73] Assignee: Intec Bielenberg GmbH & Co. KG, Kerpen-Türnich, Germany

[21] Appl. No.: 09/160,431

[22] Filed: Sep. 24, 1998

[30] Foreign Application Priority Data

Sep. 26, 1997 [DE] Germany .......................... 197 42 711

[51] Int. Cl.$^7$ ....................................................... B05B 1/02
[52] U.S. Cl. .......................... 118/302; 165/108; 165/156
[58] Field of Search .................................. 165/108, 156, 165/172, 61, 171; 118/302

[56] References Cited

U.S. PATENT DOCUMENTS

| | | | |
|---|---|---|---|
| 4,194,536 | 3/1980 | Stine et al. | 165/172 |
| 4,373,657 | 2/1983 | Fillon . | |
| 4,424,622 | 1/1984 | Matthews et al. | 165/171 |

FOREIGN PATENT DOCUMENTS 0 691 172 A1  1/1996  European Pat. Off. .
195 36 623  10/1996  Germany .
195 41 996 A1  5/1997  Germany .

*Primary Examiner*—Richard Crispino
*Assistant Examiner*—Wai-Sing Louie
*Attorney, Agent, or Firm*—Pauley Peterson Kinne & Fejer

[57] ABSTRACT

A device for simultaneous application of a plurality of adhesive spot s to a substrate, having a metering apparatus for conveying a predetermined volume of adhesive to a plurality of applicator nozzles for the application of respectively one adhesive spot to the substrate. A distribution apparatus distributes the volume of adhesive conveyed by the metering, device to the applicator nozzles. A warming medium is heated in a warning apparatus for heating the adhesive to a temperature desired for manipulation. The metering apparatus and the distribution apparatus are connected with each other by a conveying line containing an adhesive conduit. Feed lines with adhesive conduits lead from the distribution apparatus to the applicator nozzles, wherein a closed loop of the warming medium is formed, starting at the warming apparatus, and routed via the distribution apparatus and the feed lines to the applicator nozzles, and is returned via the feed lines and the distribution apparatus to the warming apparatus.

32 Claims, 9 Drawing Sheets

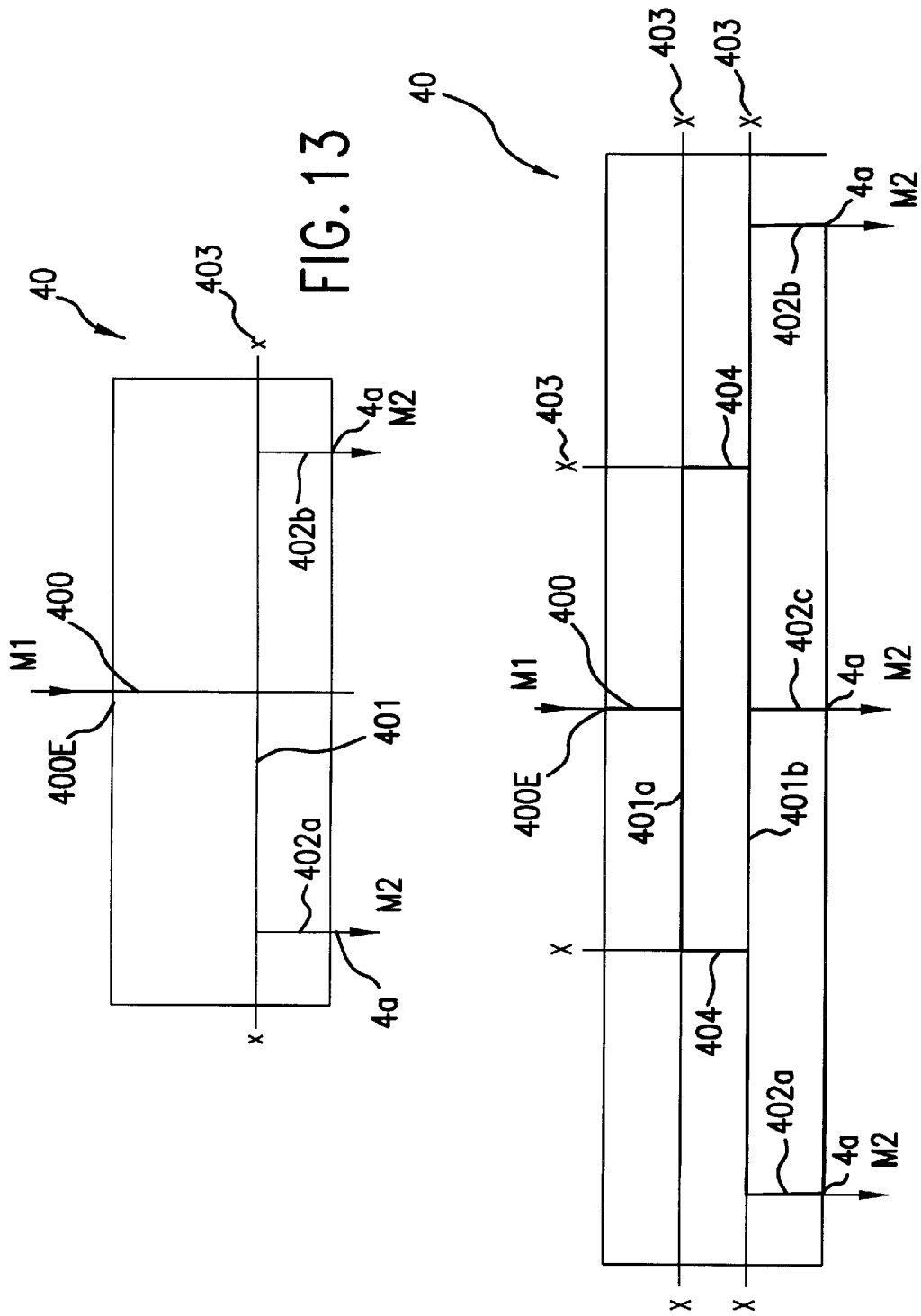

DEVICE FOR APPLYING ADHESIVE SPOTS ON A SUBSTRATE

BACKGROUND OF THE INVENTION

1. Field of the Invention

This invention relates to a device for applying adhesive in the form of adhesive spots to a substrate using applicator nozzles, having a metering apparatus and a distribution apparatus, arranged downstream of the metering apparatus, for conveying and distributing a predeterminable volume of adhesive to each applicator nozzle, and a warming apparatus for heating a warming medium for heating the adhesive, wherein the metering apparatus and the distribution apparatus are connected with each other by a conveying line containing an adhesive conduit, and wherein feed lines containing an adhesive conduit lead from the distribution apparatus to the applicator nozzles.

2. Description of Prior Art

Such devices for the application of a multitude of adhesive spots are used, for example, in automobile manufacturing for connection of several sheet metal elements of an automobile body. The adhesives employed customarily have a manipulating temperature higher than room temperature, so that it is necessary to warm the adhesive conveyed by the device and all elements of the device contacting the adhesive to the desired manipulating temperature of the adhesive by a warming apparatus, for example usually to heat it.

It is thus known to house the applicator nozzles and the distribution apparatus for distributing the conveyed adhesive to the applicator nozzles in a tub-like housing filled with a warming medium, and to warm the warming medium to the desired manipulating temperature. It is disadvantageous in connection with this known device, that the tub-shaped housing, when filled with the warming medium, can reach a considerable weight, which makes undesirably high demands on the structure of the known device and makes handling unnecessarily more difficult. Moreover, subsequent changes in the number of applicator nozzles, or respectively their arrangement, are very difficult to make, and it also requires considerable efforts to clean, or respectively exchange individual applicator nozzles in case they possibly become plugged.

SUMMARY OF THE INVENTION

It is one object of this invention, based on the known devices with their disadvantages, to provide a device having a low weight, which can therefore be easily manipulated, and which in addition provides a high degree of flexibility regarding later changes and is easily maintained.

This object is attained by a device equipped in accordance with this invention, as described in the following description and in the claims.

According to this invention, a closed loop for the warming medium is formed, starting at the warming apparatus and extending via the distribution apparatus and the feed lines to the applicator nozzles, and back again via the feed lines and the distribution apparatus to the warming apparatus. In this way the elements of the device in accordance with this invention, which come into contact with the adhesive, are evenly heated to the desired temperature by the warming medium, wherein the space requirements of the device embodied in accordance with this invention are considerably reduced in comparison with the known prior art, which makes the device in accordance with this invention easier to manipulate.

In accordance with an advantageous embodiment of this invention, warming conduits for conveying a feed as well as a return flow of the warming medium conducted in the circulation are provided in the distribution apparatus, the feed lines and the applicator nozzles. The warming medium, heated by the warming apparatus to the desired temperature, flows through these warming conduits and in this way permits the uniform warming of the components of the device in accordance with this invention coming into contact with the adhesive, and in the end warming of the adhesive to the desired manipulating temperature, wherein the adhesive flows through the device in accordance with this invention in a liquid or pasty state and is applied in the form of adhesive drops to the substrate.

In an advantageous embodiment of this invention, the distribution apparatus is designed in several elements with an upper element and a lower element for the passage of the feed, or respectively return flow of the warming medium, and a center element arranged between the upper and lower elements for passing the adhesive. The center element is warmed here by the upper and lower elements through which the warming medium flows.

In an advantageous embodiment of this invention, the distribution apparatus is designed cylindrically and the upper element, the center element and the lower element each form a cylinder section and are arranged axially on top of each other and are connected with each other, so that there is good heat transfer for the upper, or respectively lower element through which the feed, or respectively return flow of the warming medium passes to the center element through which the adhesive passes.

In this case the upper and the lower elements of the distribution apparatus advantageously each have a collection chamber centered in an interior for the feed, or respectively return flow of the warming medium, and a plurality of warming conduits leading radially outward from the collection chamber, and a collection conduit leading axially out of the respective collection chamber to the exterior which is facing away from the center element. The warming conduits of the feed lines can be connected to the warming conduits of the upper element and the lower element, and the feed, or respectively return flow of the warming apparatus can be connected to the respective collection conduit.

To reduce the number of parts and the manufacturing outlay, the upper element and the lower element of the distribution apparatus are each designed to be matching.

The center element of the distribution apparatus advantageously has a distribution chamber formed for the adhesive centered in its interior, and a plurality of distribution conduits leading radially outward from the distribution chamber, and a feed conduit leading radially from the outside into the distribution chamber, wherein the adhesive conduits of the feed lines can be connected to the distribution conduits, and the adhesive conduit of the conveying tube can be connected to the feed conduit.

Because of the embodiment in accordance with this invention of the distribution apparatus, the center element of the latter is not only used for distributing the volume of adhesive conveyed by the metering apparatus to the individual applicator nozzles, but also for distributing the feed flow conveyed by the warming apparatus to the individual feed lines of the applicator nozzles, and subsequently also for renewed combination of the return flow of the warming medium returning again from the individual distributor nozzles via the feed lines in the distribution apparatus, which return flow thereafter is again passed to the warming apparatus, so that there is closed circulation of the warming medium. Because of the above described passage of the feed or respectively return flow of the warming medium through the upper, or respectively lower element of the distribution apparatus, the upper and lower element of the distribution apparatus are heated to such an extent that they also heat the center element arranged between the upper and lower elements of the distribution apparatus, which contacts the adhesive, to the temperature desired for manipulating the adhesive.

In order to create a distribution apparatus which can be employed as universally as possible, the latter is advantageously equipped with a matching number of distribution conduits and warming conduits in the center element, or respectively the upper and lower elements, which terminate in connecting elements for the feed lines in the area of the cylindrical surface area of the distribution apparatus, so that the feed lines with their heating, or respectively adhesive conduits can be connected along the surface area of the distribution apparatus to its distribution, or respectively warming conduits. It can be advantageous to provide a sufficiently large number of such warming, or respectively distribution conduits in the distribution apparatus. For example, up to thirty such conduits in the upper, lower and center elements of the distribution apparatus can be provided so that a sufficiently large number of applicator nozzles can be connected with their respective feed lines to the distribution apparatus. If in a case of actual use fewer applicator nozzles are needed, the unused warming and distribution conduits of the distribution apparatus can be easily closed using blind plugs, so that the device in accordance with this invention can be expanded in a module-like manner.

The warming conduits and the distribution conduits of the distribution apparatus are advantageously arranged congruently viewed in their axial direction. In this way a sufficiently large space is created between neighboring warming conduits and distribution conduits, in which fastening bores for connecting the upper element, center element and lower element of the distribution apparatus can be formed.

The feed lines used in connection with the device in accordance with this invention between the distribution apparatus and the applicator nozzles advantageously have respectively one adhesive conduit for passing the adhesive, a warming conduit for passing the feed flow of the warming medium and a warming conduit for passing the return flow of the warming medium. The adhesive conduit and the warming conduits of the feed lines are enclosed in a heat-insulating envelope, and the warming conduits are arranged extending in a spiral-like manner around the adhesive conduit. By means of this arrangement the adhesive conduit can be easily heated to the temperature desired for manipulating the adhesive by means of the warming conduits through which the warming medium flows.

The applicator nozzles used with the device in accordance with this invention have a housing, in which are conduits for passing adhesive conveyed in the adhesive conduit of the feed lines to the outlet opening for the adhesive, and warming conduits for the passage of the warming medium conveyed in the warming conduits of the feed line. In this way the applicator nozzles which come into contact with the adhesive can be heated to the temperature desired for manipulating by means of the warming conduits through which warming medium flows. Branching conduits with one inlet and with the provision of several outlet openings are provided for the adhesive.

If it is intended to apply several, preferably two or three, adhesive spots at a close distance from each other to the substrate, for example automotive sheet metal elements, it is advantageous to provide preferably two to three outlet openings for the adhesive in a common applicator nozzle and to connect the outlet openings to the distribution apparatus by means of a common feed line for conducting the adhesive and also the warming medium to the applicator nozzles.

In an advantageous embodiment the applicator nozzles are made in two sections with two housing elements, wherein the outlet openings and the conduits for passing the adhesive are embodied in one housing element, and the warming conduits for passing the warming medium in the other housing element. As described in connection with the distribution apparatus, it is possible by means of this embodiment to heat the housing element of the applicator nozzles, which contacts the adhesive, to the temperature desired for manipulating the adhesive, by having the housing element fastened to it and having the warming conduits for the passage of the warming medium.

The conveying line employed in connection with this invention between the metering apparatus and the distribution apparatus can advantageously have an adhesive conduit and respectively at least one warming conduit for the passage of the feed, or respectively the return flow of a warming medium, wherein the warming conduits are advantageously arranged extending in a spiral-like manner around the adhesive conduit and are enclosed in a common heat-insulating envelope. It is thus possible to warm the adhesive conduit for the passage of the adhesive arranged in the conveying line to the temperature desired for manipulating the adhesive by using the warming conduits through which the warming medium flows.

Since the adhesive conduit of the conveying line customarily has a greater volume than the volume of the adhesive conduit of the feed line, it can be advantageous for assuring a sufficient heating capacity of the adhesive conduit to respectively provide two warming conduits for passing the feed, or respectively return flow of the warming medium, and to arrange them extending in a spiral-like manner around the adhesive conduit.

Such a conveying tube often is greatly stressed mechanically, since it forms a connection between the customarily stationary placed metering apparatus and the distribution apparatus, movably attached to a tool. In order to prevent undesired movements of the warming conduits extending in a spiral-like manner around the adhesive conduit, spacers, such as sponge rubber tubes, are provided between the warming conduits arranged in a spiral-like manner a round the adhesive conduit.

Depending on the size of the device equipped in accordance with this invention, it is also possible for the conveying line with its warming conduits to be connected to its warming apparatus, possibly together with the metering apparatus. However, within the scope of this invention it is also possible to integrate the conveying line with its warming conduits into the closed loop of the warming medium flowing through the distribution apparatus and the applicator nozzles. In such a case the warming conduits of the conveying line can be used for conducting the feed, or respectively return flow of the warming medium between the warming apparatus and the distribution apparatus.

A particularly compact and simply constructed device in accordance with this invention is created if the closed loop for the heating medium is conducted through all components used for conveying and/or guiding the adhesive so that, starting at the warming apparatus, the closed loop is formed passing through the metering apparatus, the conveying line the distribution apparatus and the feed lines to the applicator nozzles, and back again through the feed lines, the distribution apparatus, the feed lines and the metering apparatus into the warming apparatus. A device in accordance with this invention embodied in this way therefore only requires a single warming apparatus, i.e. warming of the warming medium takes place in only a single device, which drastically reduces the operating costs for warming, since only a single temperature control location is required for the entire device.

This invention will be explained in more detail by using, exemplary embodiments.

BRIEF DESCRIPTION OF THE DRAWINGS

FIG. 13 shows a schematic plan view of an element of an applicator nozzle used for conducting the adhesive;

FIG. 14 shows a schematic plan view of a further embodiment of a housing element of the applicator nozzle;

DESCRIPTION OF PREFERRED EMBODIMENTS

Figure 1:
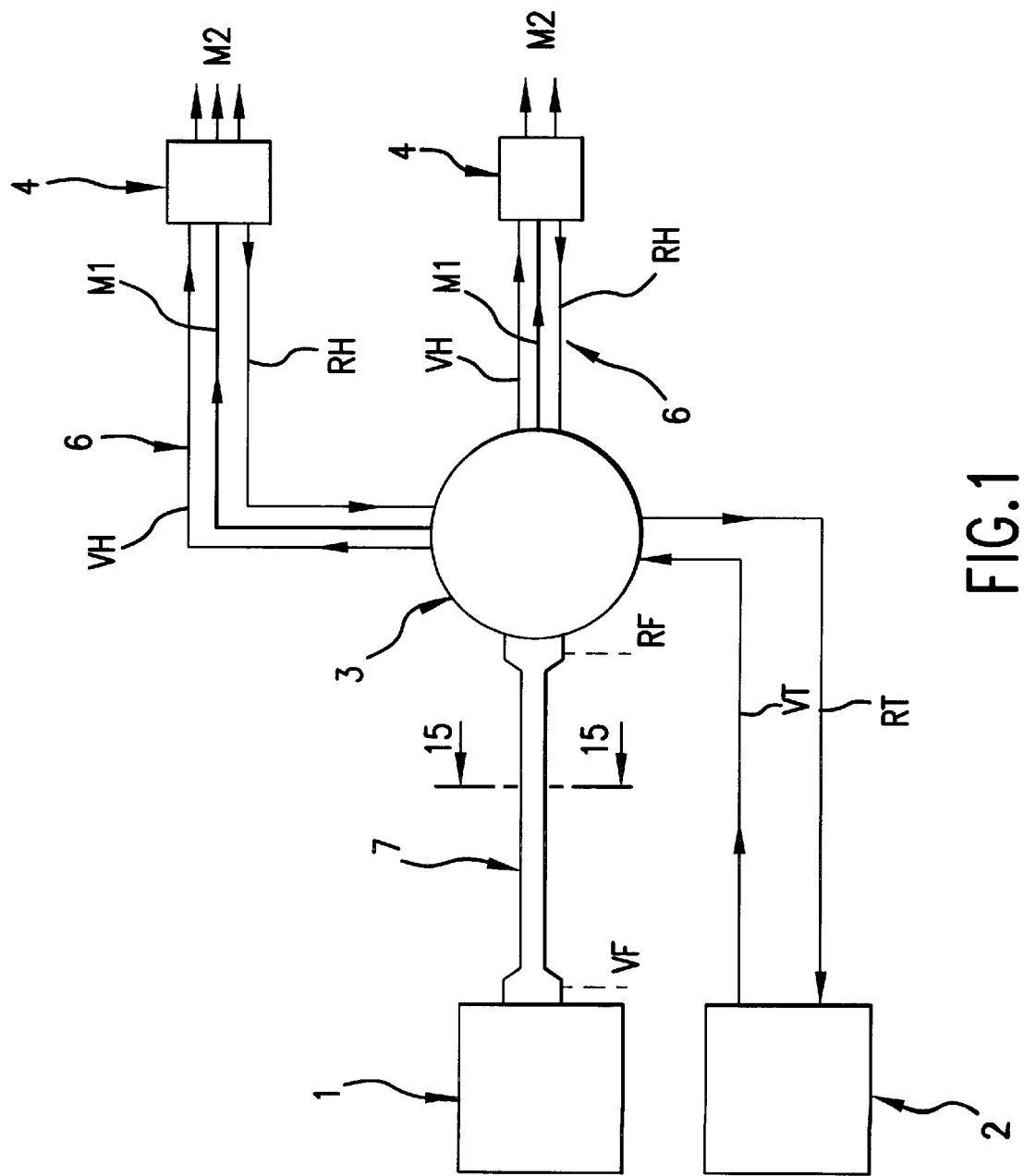
FIG. 1 is a schematic diagram of a device in accordance with this invention.

A de vice for the simultaneous application of a plurality of adhesive spots on a substrate is schematically shown in FIG. 1. The device has a metering apparatus 1, a distribution apparatus 3, several applicator nozzles 4 and a warming apparatus 2. The metering apparatus 1 is connected via a conveying line 7 with the distribution apparatus 3, from which feed lines 6 lead to the individual applicator nozzles 4. Each applicator nozzle 4 is designed in such a way that it preferably has more than one outlet opening, so that it is possible to simultaneously make a number of adhesive spots corresponding to the number of outlet openings of each applicator nozzle 4. The application of an adhesive spot to a substrate, not shown in the drawing, takes place in such a way that the metering apparatus 1 conveys a predetermined amount of adhesive via the conveying line 7 to the distribution apparatus 3, in which this conveyed, predetermined amount of adhesive is evenly distributed to the individual feed lines 6 in the form of adhesive flows M1. The respective adhesive flow M1 exits the individual applicator nozzles 4 in accordance with the arrows M2 and forms the adhesive spots on the substrate.

A device of this type is suitable, for example, for the application of a plurality of adhesive spots to automotive sheet metal elements in order to connect these automotive sheet metal elements with each other. Adhesives employed for this purpose customarily have a manipulating temperature which is above room temperature, so that it is necessary to heat the adhesive to the manipulating temperature and to compensate for heat losses. The warming apparatus 2 is provided for this for warming the parts coming into contact with the adhesive, at least the distribution apparatus 3 and the applicator nozzles 4, by means of its warming medium to a temperature which makes it possible to heat the adhesive to its desired manipulating temperature.

For the purpose of this heating, the warming apparatus 2 contains, for example, a flow heater as the warming apparatus and water as the warming medium, in order to heat the components of the device to be warmed with the aid of this water. To this end, the device shown in FIG. 1 has a closed loop of the warming medium, which is conveyed by the warming apparatus used as the warming apparatus 2 to the distribution apparatus 3 as the feed flow VT, from where it flows along feed lines 6 as the feed flow VH to the applicator nozzles 4, and back from the applicator nozzles 4 via the feed lines 6 as return flow RH to the distribution apparatus 3, and from the distribution apparatus 3 back into the warming apparatus 2 as return flow RT.

Similar to the conveying of the adhesive, the distribution apparatus 3 is also used within the closed loop of the warming medium for distributing the feed flow VT conveyed from the warming apparatus 2 and to distribute the feed flow evenly as the feed flow VH to the individual feed lines 6 leading to the applicator nozzles 4. In the reverse way, the distribution apparatus 3 is also used to combine the individual return flows RH of the warming medium from the applicator nozzles 4 and to return them as a combined return flow RT to the warming apparatus.

By means of this conveyance of the warming medium in a closed loop it is possible by means of a single warming apparatus 2 to heat the distribution apparatus 3, all the feed lines 6 and all the applicator nozzles 4. Thus the adhesive is heated on this path from the metering apparatus until the flow exits from the applicator nozzles to the temperature desired for manipulating the adhesive. Because of the closed loop, the device makes do without additional tub-like housings or the like, in which the warming medium is maintained, which considerably reduces the size and weight of the device and thus makes its manipulation easier.

The distribution apparatus 3, only schematically shown in FIG. 1, is shown in greater detail by means of an exemplary embodiment in FIGS. 2 to 9. As can shown in FIGS. 2 and 3, the distribution apparatus 3 has a cylindrical shape and is constructed of several cylindrical elements placed on top of each other and put together by means of screws 33, 34, thus forming an upper element 30, a center element 31 and a lower element 32. In this case the upper element 30 and the lower element 32 of the distribution apparatus 3 are used for passing the warming medium, while the center element 31 arranged between the upper element 30 and the lower element 32 is used for passing and distributing the adhesive. In the present example, the feed flow VT of the warming medium is passed through the upper element 30, and the return flow RH through the lower element 32. This assignment of the upper element 30 and lower element 2 to the feed flow, or respectively return flow of the warming medium described above has been selected only as an example, the reversed association is also possible.

Figure 4:
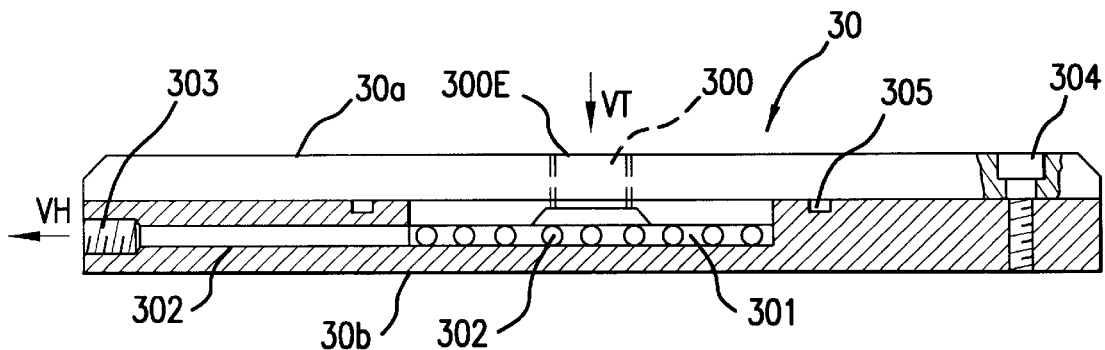
FIG. 4 is a sectional view taken through the upper element of the distribution apparatus along line A—A, as shown in FIG. 5.
Figure 5:
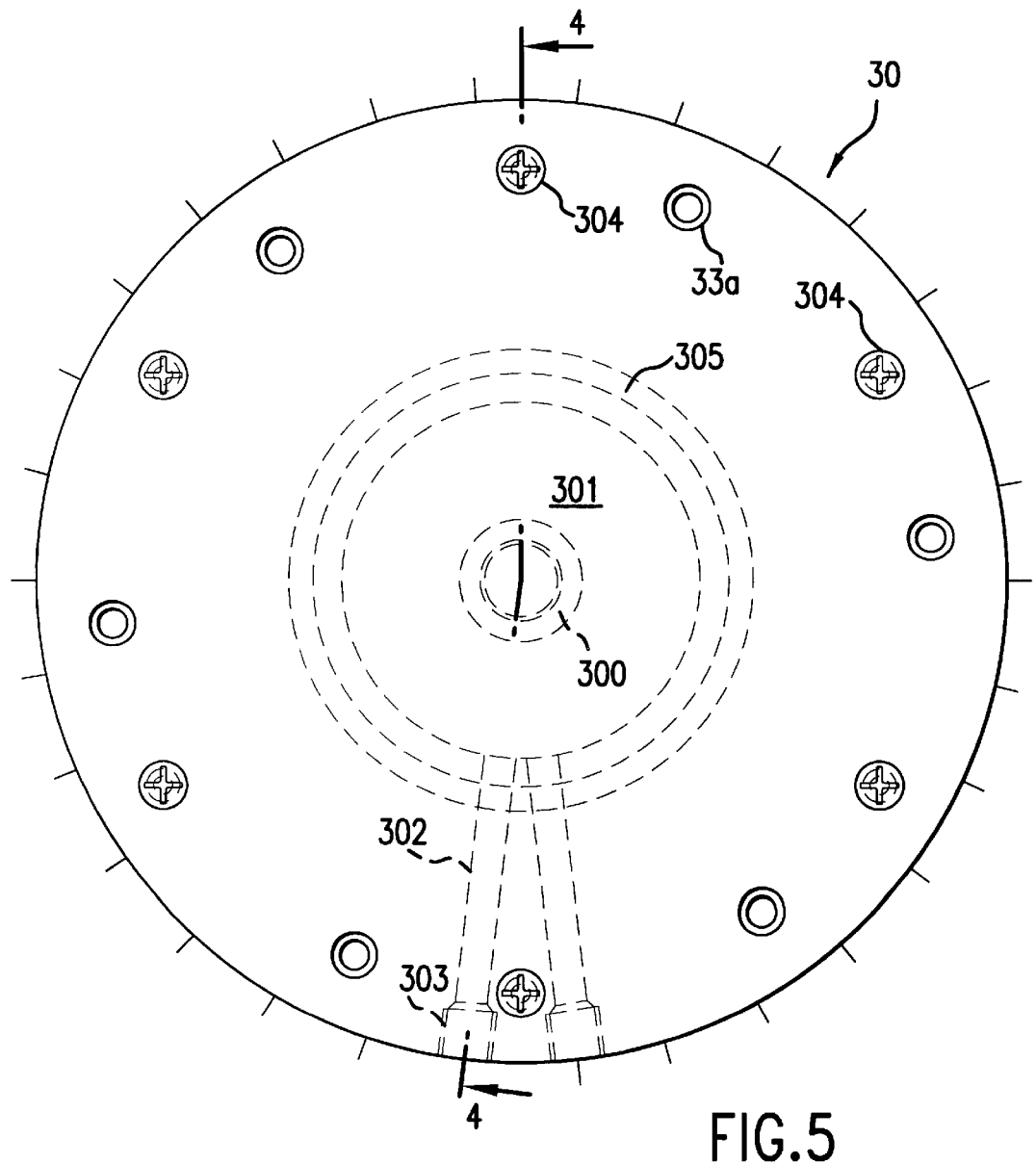
FIG. 5 is a top view of the upper element of the distribution apparatus.

The upper element 30 of the distribution apparatus 3 is shown in greater detail in FIGS. 4 and 5. Starting from a top, which si multaneously also constitutes the top of the distribution apparatus 3 embodied in three elements, the upper element 30 has the collection conduit 300, which is arranged centered and axially leads into the interior of the upper element 30, having an inlet 300E through which the warming medium of the feed flow VT conveyed from the warming apparatus 2 is conducted to the distribution apparatus 3. In the interior of the upper element 30, the collection conduit 300 terminates in a collection chamber 301, which is wider than the collection conduit 300, and from which a plurality of warming conduits 302 radiate in a star shape radially outward as far as the surface area of the upper element 30. Each of the warming conduits 302 have the same length and diameter, so that the warming medium entering in the form of the feed flow VT via the collection conduit 300 is divided into even portions from the collection chamber 301 to the warming conduits 302 and flows through them. Threaded bores 303 are respectively provided at the outer ends of the warming conduits 302 as outlets, to which suitable tube connecting elements for connecting tube assemblies of the feed lines 6 used as warming conduits to the individual applicator nozzles 4 can be connected.

For easier production of the above described upper element 30 it is, as shown in FIG. 4, assembled from two parts 30a, 30b, which are connected with each other by means of screw connections 304 and are sealed against each other by means of a sealing groove 305 formed in the part 30b with a seal, not represented here. The collection conduit 300 is embodied in the part 30a of the upper element 30, the collection chamber 301 and the warming conduits 302 radially arranged in a star shape are provided in the part 30b. The threaded holes 304 for connecting the parts 30a, 30b, and the threaded holes 33a for screwing in the screws 33 for the purpose of fastening the upper element 30 on the center element 31 are respectively formed aligned in the two parts 30a, 30b, wherein the respective threaded holes 304, 33a are altematingly arranged in the upper element 30.

Figure 6:
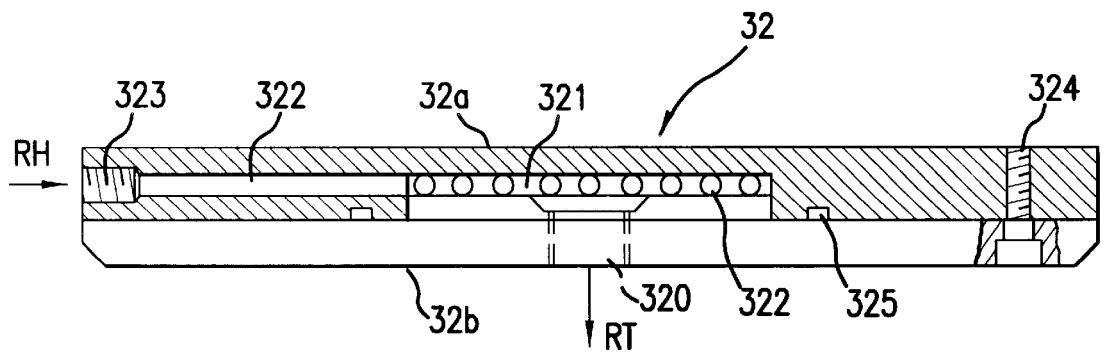
FIG. 6 is a sectional view taken through the lower element of the distribution apparatus along line C—C, as shown in FIG. 7.
Figure 7:
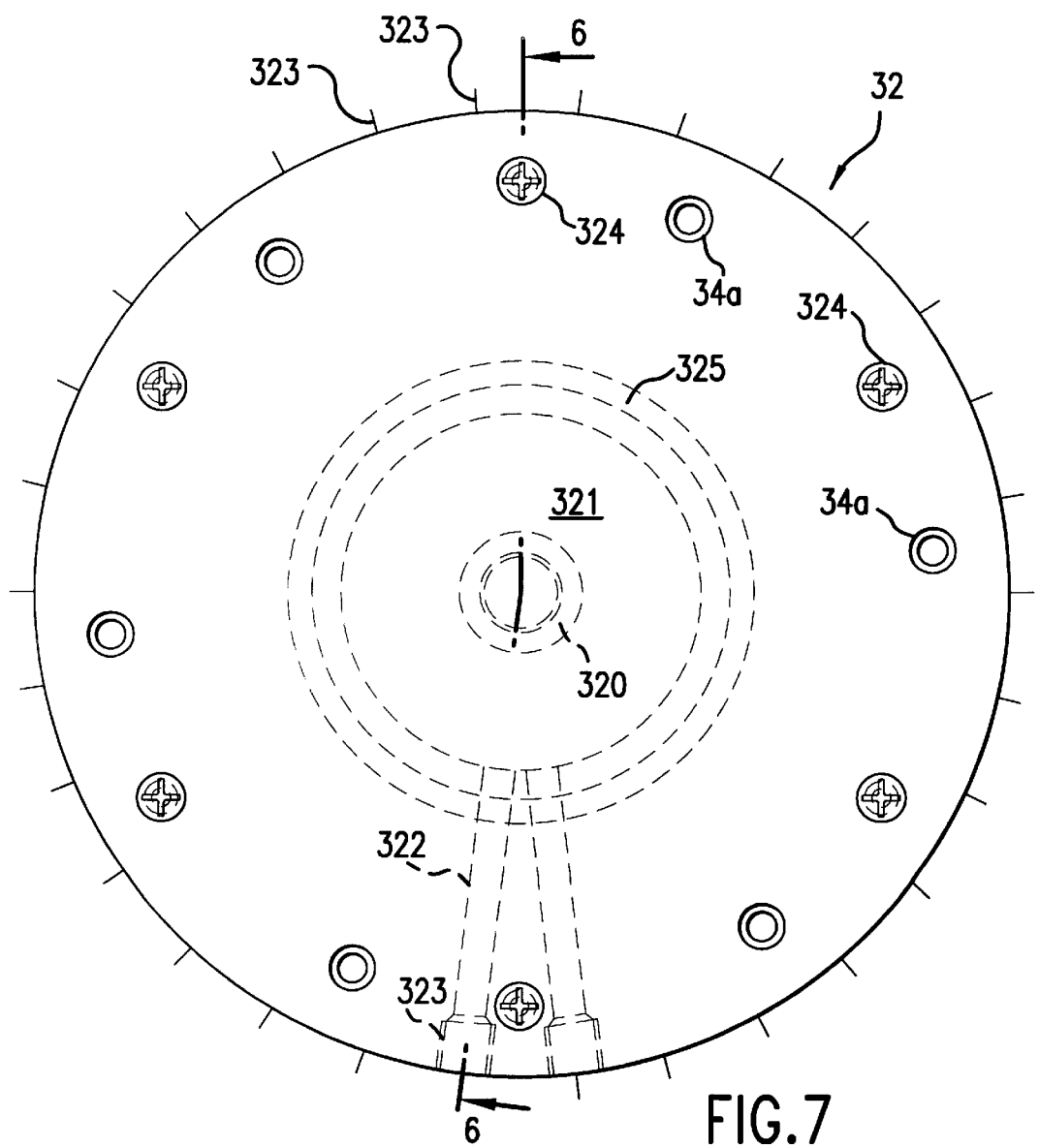
FIG. 7 is a top view of the lower element of the distribution apparatus.
Figure 8:
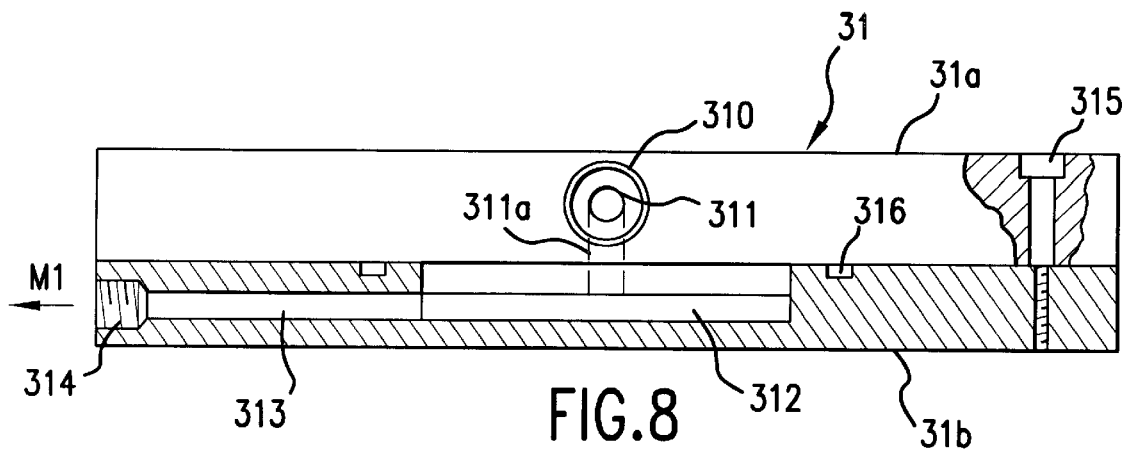
FIG. 8 is a sectional view taken through the center clement of the distribution apparatus along line B—B, as shown in FIG. 9.
Figure 9:
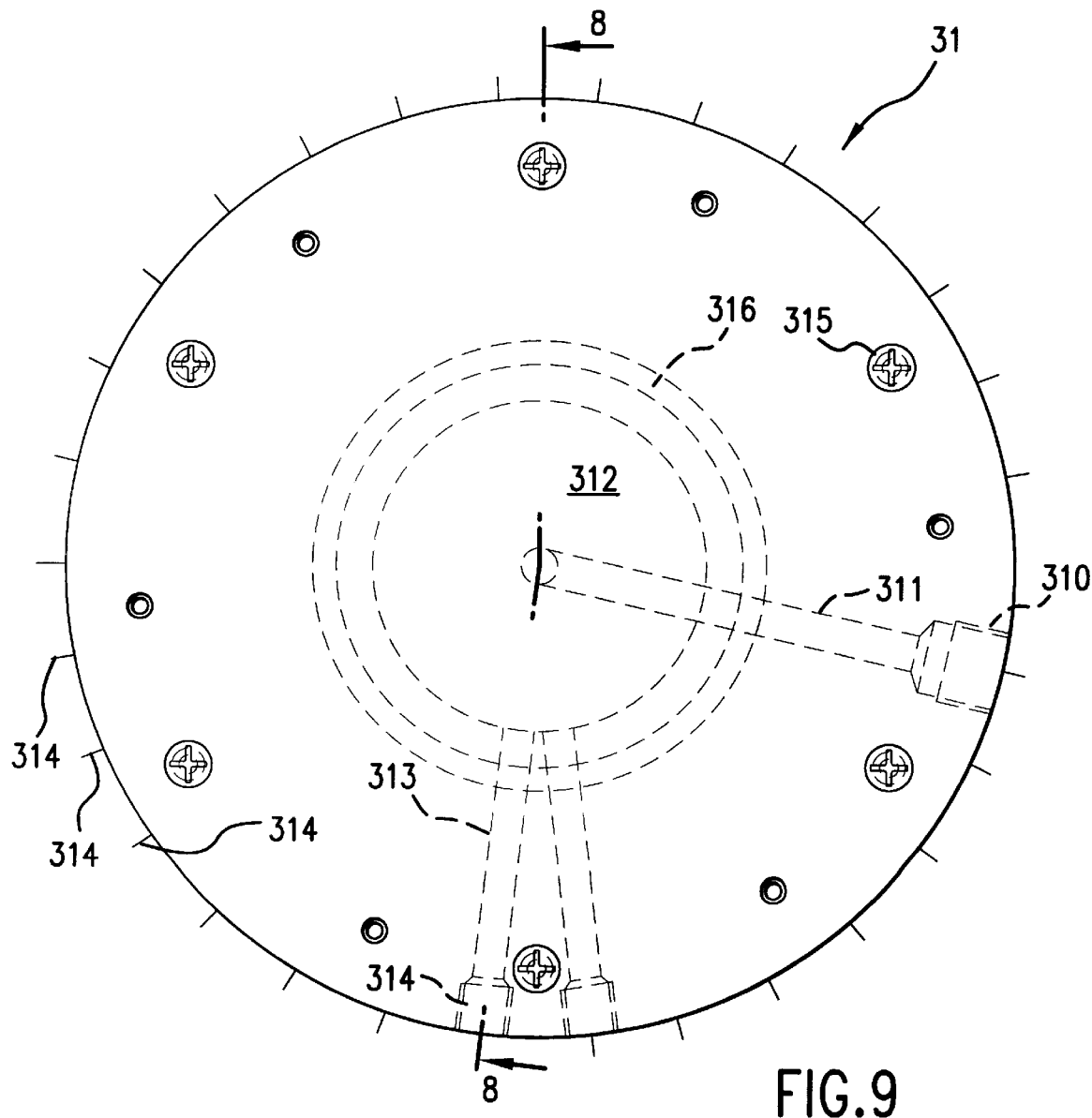
FIG. 9 is a top view of the center element of the distribution apparatus.

The lower element 32 of the distribution apparatus 3, shown in more detail in FIGS. 6 and 7, which is used for receiving and guiding the return flow RH of the warming medium from the individual feed lines 6 to the warming apparatus 2, has an almost identical structure, however, the flow direction through the lower element 32 is the reverse of the flow direction through the upper element 30. The lower element 32 also has warming conduits 322, arranged radially in a star-shape, which terminate in a centrally arranged collection chamber 321, which approximately corresponds to the collection chamber 301 of the upper element 30. A collection conduit 320 leads axially from the center of this collection chamber 321 in the interior of the lower element 32 to the underside of the lower element 32, which at the same time forms the underside of the distribution apparatus 3. On their input side for the return flow, the warming conduits 322 have threaded bores 323 for connecting means to the feed lines. The individual return flows RH of the feed lines 6 flow from the respective applicator nozzles 4 through connecting means for the warming conduits inserted in the threaded bores 323 into the collection chamber 321. The return flows RH exit the collection chamber 321 together as a combined return flow RT of the warming medium, which is conducted to the warming apparatus 2. The lower element 32 is also assembled from two parts 32a, 32b for easier manufacture and formed by means of screwing it together in threaded holes 324 and seals inserted into a sealing groove 325. wherein the part 32b has the collection conduit 320, and the warming conduits 322, radially arranged in a star-shape, and the collection chamber 321 are formed in the part 32a.

The center element 31 of the distribution apparatus 3 is arranged between the upper element 30 and the lower element 32. The center element 31, which is shown in greater detail in FIGS. 8 and 9, also has a cylindrical shape and is assembled from two parts 31a, 31b for easier manufacture, which are connected with each other via screws in threaded holes 315 and seals in a sealing groove 316. A feed conduit 311 is formed in the part 31a of the center element 31, which is arranged, starting from the surface area of the center element 31, as an input extending radially inward and terminating via a vertically downward extending, centrally arranged conduit section 311a in a distribution chamber 312. The adhesive conduit of the conveying line can be connected to the feed conduit 311 in the area of the surface of the center element 31 by means of a suitable connecting device inserted into a threaded bore 310 at the end of the feed conduit 311, so that the volume flow of adhesive conveyed from the metering apparatus 1 via the conveying line 7 reaches the distribution chamber 312 of the center element 31 via the feed conduit 311. Distribution conduits 313, again radially arranged in a star shape, which respectively have the same diameter and length, lead from this distribution chamber 312 to the surface area of the part 31b of the center element 31, wherein threaded bores 314 for screwing in suitable connection means for the adhesive conduits of the feed lines 6 are again provided at the outer ends of the distribution conduits 313. Thus, the volume flow of adhesive entering via the feed conduit 311 is, similar to the feed flow VT of the warming medium in the upper element 30 of the distribution apparatus 3, divided in even portions into the distribution conduits 313 in the distribution chamber 312 and issues as adhesive flow M1 from the distribution conduits 313 and reaches the applicator nozzles 4 via the feed lines 6.

The feed flow VT of the warming medium is distributed by the warming apparatus 2 by means of the distribution apparatus 3 to the individual feed lines 6, the return flows RH are brought together from the applicator nozzles 4 via the feed lines 6 into a common return flow RT to the warming apparatus 2, and the adhesive flow from the conveying line 7 to the feed lines 6 is distributed to the applicator nozzles 4 in partial adhesive flows M1 . In this case it is essential for the dependability of the process that the feed flow of the warming medium flows through the upper element 30 and the return flow through the lower element 32, which are therefore heated in accordance with the temperature of the warming medium, and that the center element 31, arranged between the upper element 30 and the lower element 32 of the distribution apparatus 3 and in contact with them, through which the adhesive is conducted, is inevitably heated to the temperature desired for manipulating the adhesive, so that the heating of the adhesive takes place in a simple way while it flows through the distribution apparatus 3. However, since the flow paths of the feed flow VT, return flow RT of the warming medium in the upper element 30 and the lower element 32 are strictly separated from the adhesive flow through the center element 31, there is no danger of any contamination of the adhesive with warming medium, and vice versa. The distribution apparatus is preferably made of a material with good heat conduction.

Figure 2:
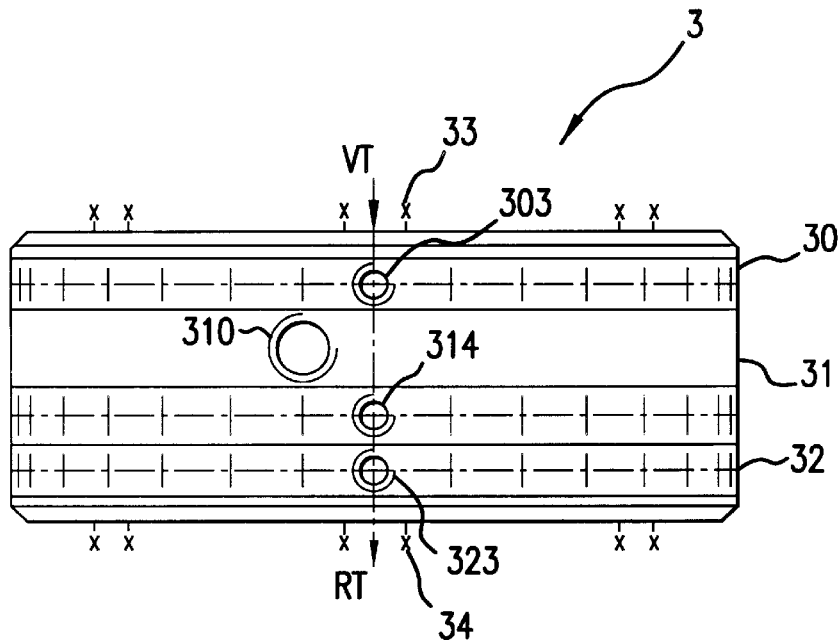
FIG. 2 is a side view of a distribution apparatus in accordance with FIG. 1.
Figure 3:
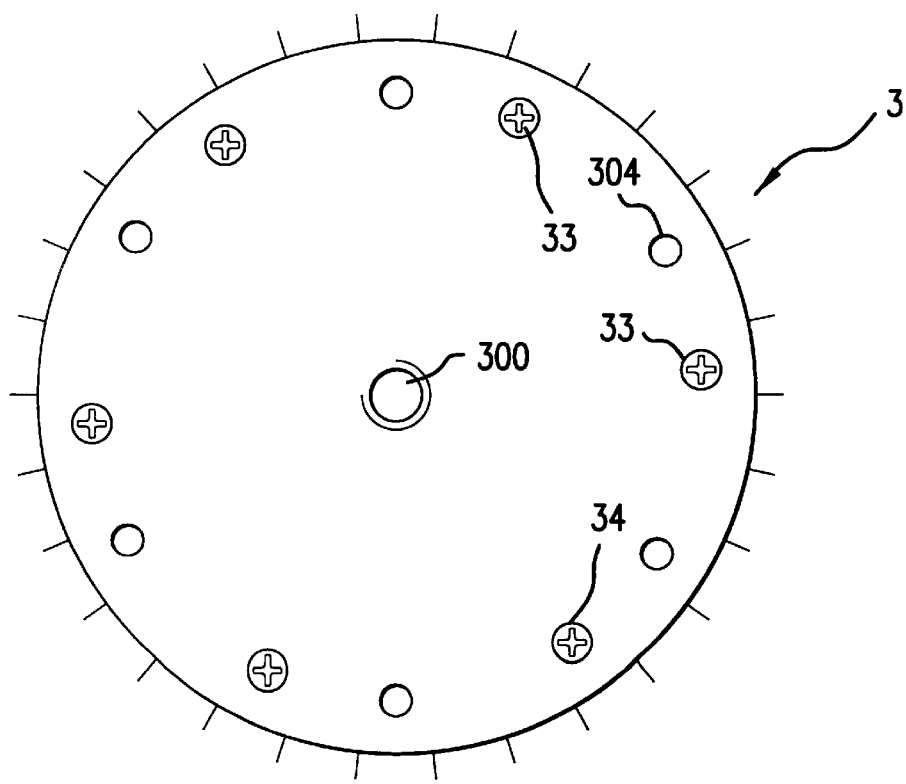
FIG. 3 is a top view of the distribution apparatus in accordance with FIG. 2.

As shown in FIG. 2, the arrangement of the warming conduits and distribution conduits in the upper element 30, the lower element 32 and the center element 31 takes place in such a way, that these conduits are arranged respectively parallel with each other radially and in a star shape and, viewed in the axial direction of the cylindrically embodied distribution apparatus 3, are respectively congruently arranged. It is therefore possible to respectively connect the feed line 6 for the applicator nozzle 4 to each group of parallel and congruently extending warming conduits in the upper element 30 and the lower element 32 and the distribution conduit in the center element 31.

Figure 16:
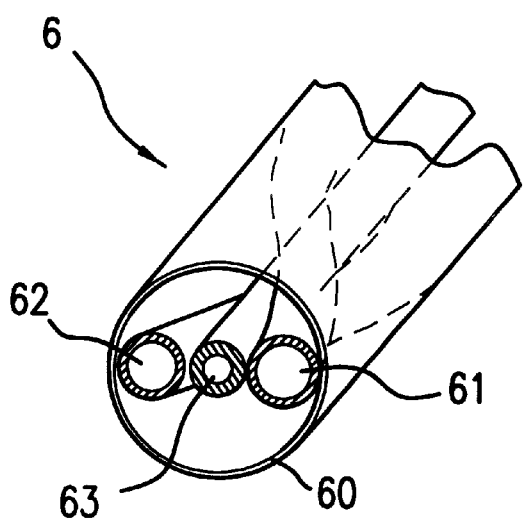
FIG. 16 is a perspective sectional view taken through a conveying line.

Such a feed line 6, which is used as a connection between the distribution apparatus 3 and the application nozzles 4, is shown in greater detail in FIG. 16. Corresponding to the previously explained structure of the distribution apparatus, the feed line 6 has a centrally arranged adhesive conduit 63, which is connected with a distribution conduit 313 of the center element 31 of the distribution apparatus 3 and is used for conducting an adhesive flow M1 to an applicator nozzle 4. Also., the feed line 6 contains two warming conduits 61, 62, wherein the one warming conduit 61 is used for conducting the feed flow VH of the warming medium and is connected with a warming conduit 302 of the upper element 30 of the distribution apparatus 3. The other warming conduit 62 is used for conducting the return flow RH from the applicator nozzle 4 to the distribution apparatus 3 and is connected with a warming conduit 322 of the lower element 32 of the distribution apparatus 3. The adhesive conduit 63 and the warming conduits 61, 62 of the feed line 6 arc enclosed in a heat-insulating envelope 60. In order to heat the adhesive conduit 63 of the feed line 6, which contacts the adhesive, to the temperature desired for manipulating, the warming conduits 61, 62 of the feed line 6 are arranged so they extend in a spiral-like manner around the adhesive conduit 63, so that the adhesive conduit 63 is heated, corresponding to the temperature of the warming medium, by the warming conduits 61, 62, through which the warming medium flows as the feed flow VH, or respectively the return flow RH.

These feed lines 6, connected at one end to the distribution apparatus 3, lead to applicator nozzles 4, are shown in greater detail in FIGS. 10 to 14.

Figure 10:
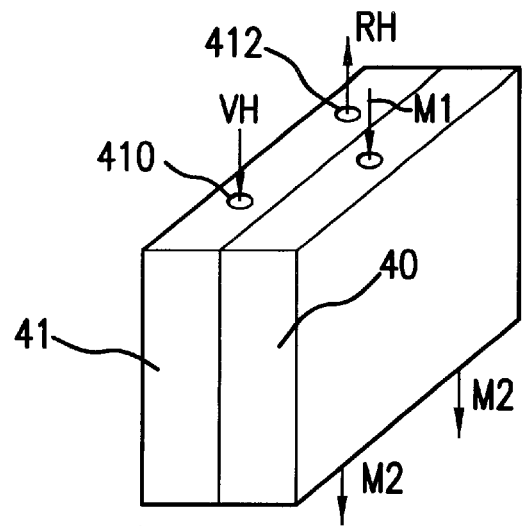
FIG. 10 is a side perspective view of an applicator nozzle.

Similar to the distribution apparatus 3, each applicator nozzle 4 is embodied in several parts by housing elements 40, 41, shown in FIG. 10, which are connected with each other. The housing element 40, which is shown in greater detail in FIGS. 13 and 14 in two embodiments, is used for conducting the adhesive, while the housing element 41, which is shown in greater detail in FIGS. 11 and 12 in two embodiments, is used for conducting the warming medium.

The housing element 40 of the applicator nozzle 4, used for conducting the adhesive, is essentially embodied in a cuboid shape and has, starting at its input 400E, a conduit system branching off in its interior with adhesive conduits 400, 401, 402, which lead to a corresponding number of outlet openings 4a for the adhesive. The partial volume flow M1 of adhesive, conveyed from the feed line 6 via the adhesive conduit 63, enters the housing element 40 via the adhesive conduit section 400, and leaves this housing 40 via the branched adhesive conduit sections 402a, b, on whose lower ends the outlet openings 4a of the applicator nozzle 4 are arranged, wherein the outlet of the adhesive is identified by arrows M2, and respectively leaves an adhesive spot of the adhesive on the substrate, not represented here, for example an automotive sheet metal element. It is possible, depending on the prevailing conditions and the number and arrangement of the adhesive spots, to provide two or three or more outlet openings 4a for the adhesive in accordance with the arrows M2. In the exemplary embodiment shown in FIG. 13, two outlet openings 4a are provided, which are arranged at the end of the adhesive conduit sections 402a, b and are connected via a common adhesive conduit section 401 with the adhesive conduit section 400, through which the adhesive flow M1 enters the housing element 40.

But in the exemplary embodiment shown in FIG. 14, the housing element 40 of the applicator nozzle 4 has a conduit system which is branched in such a way that, starting from the inlet conduit 400, three outlet openings 4a for the adhesive flow M2 are formed at the end of the adhesive conduit sections 402a, b, c, and are connected via the adhesive conduit sections 401a, 401b, 404 with the adhesive conduit section 400, through which the adhesive flow M1 enters the housing element 40.

For making the production of the adhesive conduits sections in the housing element 40 easier, it is proposed to embody the adhesive conduit sections as through, or respectively blind bores in the housing element 40, and afterward to close the longitudinal sections of these bores, which are not needed, by blinds plugs 403, so that at the end only the desired course of the adhesive conduit sections is left open in the housing element 40.

Figure 11:
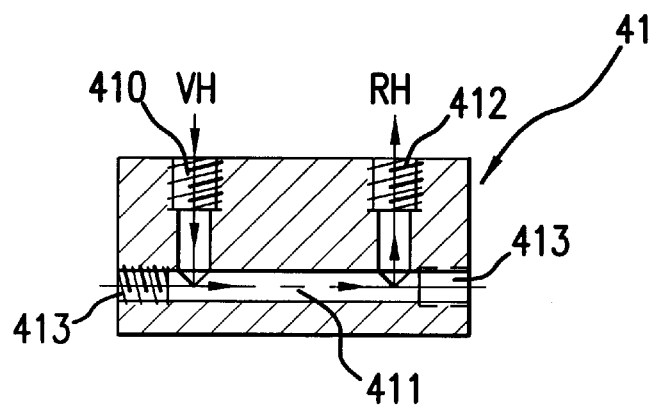
FIG. 11 is a sectional view taken through a housing element of the applicator nozzle having warming conduits for the warming medium.
Figure 12:
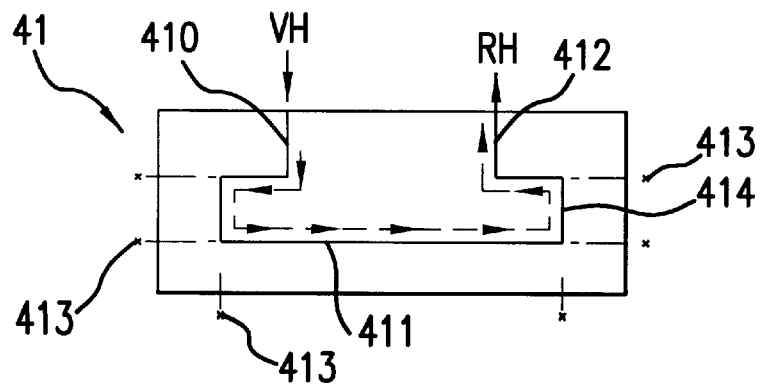
FIG. 12 shows a schematic view of a further embodiment of a housing element of the applicator nozzle.

The housing element 41 is used for heating the housing element 40 of the applicator nozzles 4 which contacts the adhesive, and is represented in greater detail in FIGS. 11 and 12. The housing element 41 has a warming conduit 411, through which the warming medium conveyed by the feed line 6 as the feed flow VH via the warming conduit 61 flows in, and afterwards flows out of the housing element 41 again as the return flow RH, and is conducted back via the warming conduit 62 of the feed line 6 to the lower element 32 of the distribution apparatus 3, and thereafter to the warming apparatus 2. For this purpose the warming, conduit 411 has threaded bores 410, 412 on its two ends, into which suitable connecting means for connecting the warming conduits 61, 62 of the feed line 6 can be screwed. Preferably these connecting means are designed the same as those which are also screwed into the threaded bores 303, 323 of the upper element 30 and the lower element 32 of the distribution apparatus 3, and to which the warming conduits 61, 62 of the feed lines 6 are also connected. The connecting elements are known in fluid technology, or respectively pneumatic technology. In connection with the housing element 41 it is also suggested for simplifying their manufacture to cut the individual sections of the warming conduits as through, or respectively blind bores and to close the unneeded longitudinal sections of the bores by means of blind plugs 413. In FIG. 11 a housing element 41 for the passage of the warming medium is furthermore represented which is used, for example, when only one or two outlet openings 4a are embodied in the housing element 40 of the applicator nozzle 4 in accordance with FIG. 13, while the housing 41 represented in FIG. 12 has a flow path which is extended by the warming conduit sections 414, and therefore can be used for the housing element 40 with three outlet openings 4*a* in accordance with FIG. 14, but is not shown to scale.

In every case the housing elements 40, 41, as represented in FIG. 10, are connected with each other, so that an accurate separation of the adhesive flow M1, M2 through the housing element 40, and the flow of the warming medium with the feed flow VH and return flow RH through the housing element 41 is provided. Because of the passage of the feed flow VH, or respectively of the return flow RH of the warming medium, the housing element 41 is heated to the temperature of the warming medium, i.e. to the temperature desired for manipulating the adhesive, and at the same time is warms the housing element 40, which is connected with the housing element 41 and contacts the adhesive, so that the housing element 40 of the applicator nozzle 4 is also heated to the temperature desired for manipulating the adhesive, and the adhesive which is conducted through the warmed housing element 40 is maintained at the desired manipulating temperature.

Thus, heating of the distribution apparatus 3, the feed lines 6 and the applicator nozzles 4 is accomplished because the warming medium is conducted in a closed loop, and with little outlay is conducted spatially separated past the elements which contact the adhesive, so that all elements of the device which contact the adhesive are heated to the temperature desired for manipulating the adhesive. The space requirements of such a device are thus considerably reduced, and handling is thereby simplified.

Figure 15:
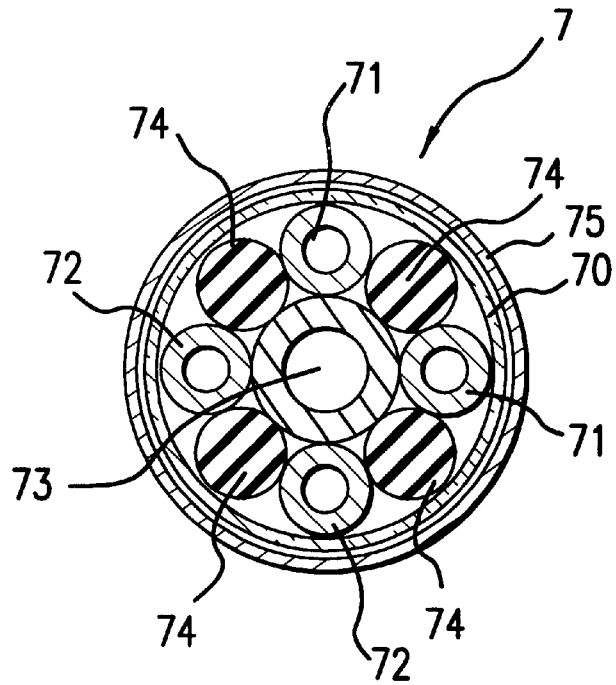
FIG. 15 is a sectional view taken through a conveying line along line F—F shown in FIG. 1, or respectively shown in FIG. 17.

In order to heat the conveying line 7 between the metering apparatus 1 and the distribution apparatus 3 to the temperature desired for manipulating the adhesive, it has the structure represented in greater detail in FIG. 15.

As shown in FIG. 15, the conveying line 5 contains a centrally arranged adhesive conduit 73, which is surrounded by respectively two warming conduits 71 used for the feed flow of a warming medium, and two warming conduits 72 used for the return flow of the warming medium. As already explained in connection with the feed line in accordance with FIG. 16, the warming conduits 71, 72 of the conveying line 7 are also arranged extending in a spiral shape around the adhesive conduit 73, and by means of the passage of an appropriate warming medium allow the heating of the adhesive conduit 73 to contact the adhesive to a temperature desired for manipulating the adhesive. Spacers in the form of sponge rubber tubes 74 are arranged between the individual warming conduits 71, 72, which prevent undesired movements of the warming conduits 71, 72, and the entire arrangement of the adhesive conduit 73, the warming conduits 71, 72 and the spacers 74 is enclosed in a heat-insulating envelope 70 in order to also assist with the heating of the adhesive conduit 73 to a temperature desired for manipulating the adhesive. In addition, a helically wound wire 75 is provided at the outside of the conveying line 7 in order to protect the conveying line 7 against excessive bending or similar stresses.

Depending on the size of the entire device and the amount of the conveyed adhesive it can be provided for the passage of the warming medium through the warming conduits 71, 72 of the conveying line 7 to either provide the temperature medium with its own circulation with a feed flow VF and a return flow RF, as shown in FIG. 1. But it is also possible to integrate the conveying line 7 into the closed loop of the warming medium for warming the distribution apparatus 3, the feed lines 6 and the applicator nozzles 4. Different from the representation in accordance with FIG. 1, it is possible to arrange the feed flow VT so that it is not running on a direct path to the distribution apparatus 3, but that instead it is conducted to the distribution apparatus 3 via the feed flow VF of the conveying line 7. In the reverse manner, the return flow RT is conducted from the distribution apparatus 3 via the return flow with the corresponding warming conduits 72 of the conveying line 7, and then reaches the warming apparatus 2.

Figure 17:
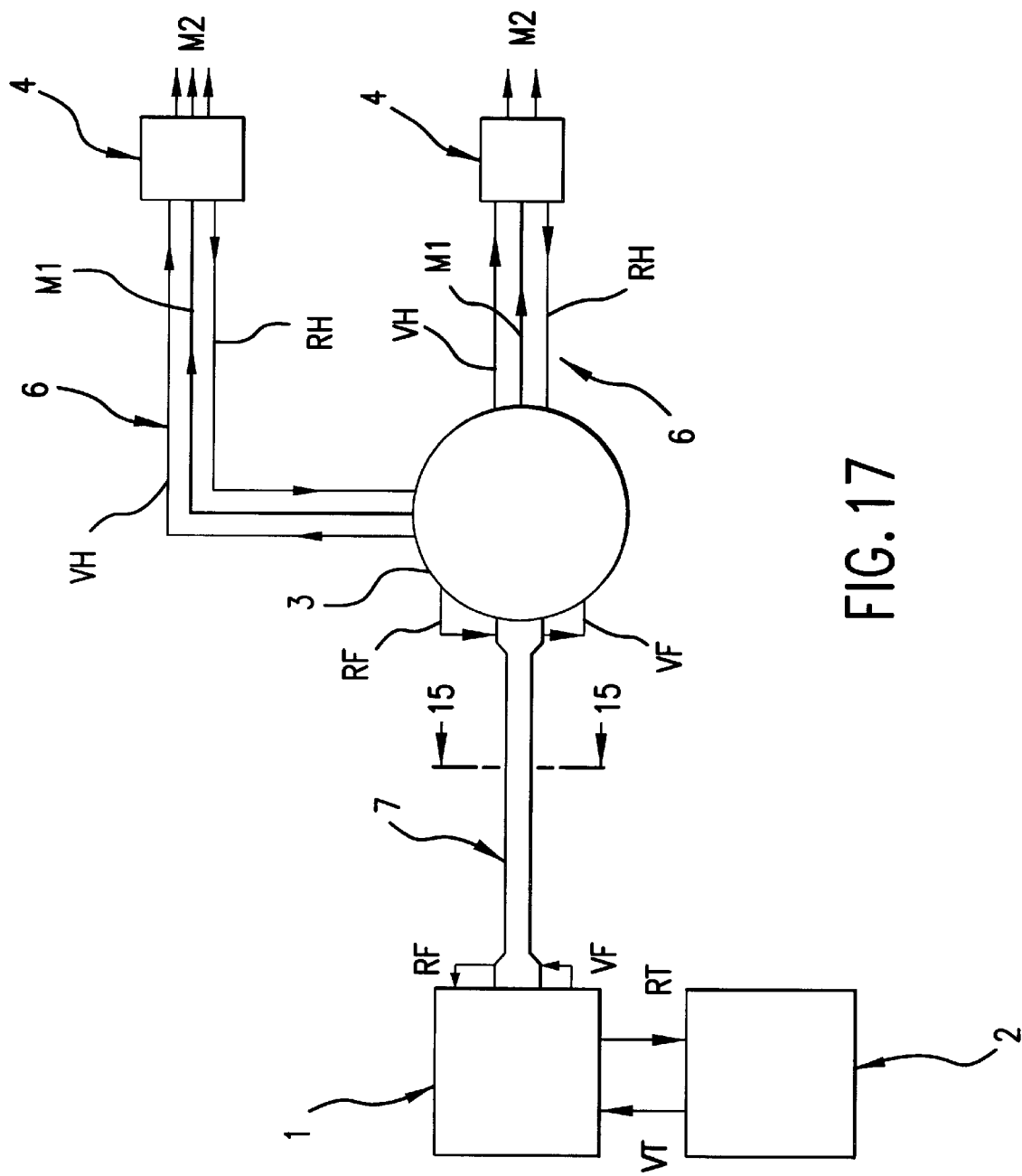
FIG. 17 is a schematic diagram of a further embodiment of this invention.

A particularly compact and simply constructed device is shown in FIG. 17. With this device, only a single heating apparatus 2 is required for heating all components of the device coming into contact with the adhesive. Starting at the warming apparatus 2, the feed flow VT of the warming medium is first conducted to the metering apparatus I and is used here for heating the components of the metering apparatus 1 to the temperature desired for the manipulation of the adhesive. Thereafter, via the conveying line 7 this feed flow reaches the distribution apparatus 3 as the feed flow VT, where the feed flow is distributed through the individual feed lines 6 to the applicator nozzles 4 and flows through the warming conduits 61 of the feed lines 6 as the feed flow VT. The return flow RH of the warming medium flowing back from the applicator nozzles 4 through the feed lines 6 is brought together in the already described manner in the distribution apparatus 3 and enters the conveying line 7 as the return flow RF, subsequently gets into the conveying line 7, from there to the metering apparatus 1 and, as the return flow RT, flows back from the metering apparatus 1 into the warming apparatus 2, so that the loop of the warming medium is closed.

The above described device for the simultaneous application of a plurality of adhesive spots of an adhesive to a substrate is particularly suited for application in the connection of automotive sheet metal elements. To this end a sufficiently large number of applicator nozzles 4 is fastened in accordance with the predetermined adhesive design by suitable fastening means in a holder, not represented here for reasons of simplicity, to which the distribution apparatus 3 can also be rigidly connected. The applicator nozzles 4 and the distribution apparatus 3 are connected with each other by means of feed lines 6, so that an application tool is created, which can be warmed and which has a particularly small space requirement and low weight. In order to assure here the greatest possible flexibility in respect to later changes, as well as a possibly required exchange of individual applicator nozzles 4, the distribution apparatus can be modularly constructed and can be expandable by providing a sufficiently large number of distribution conduits 313 and corresponding warming conduits 302, 322 in respectively the same numbers. In connection with the exemplary embodiment in accordance with the drawings, for example, thirty warming conduits 302, 322 and corresponding to that thirty distribution conduits 313 for the adhesive are provided. If not all warming, or respectively distribution conduits are needed, they can be closed off in a simple manner by means of blind plugs.

A module-like expandable device, constructed in this way, can be refitted within a very short time and maintained to meet different requirements, which increases the efficiency of the above described device.

What is claimed is:

1. In a device for applying an adhesive in a form of a plurality of adhesive spots to a substrate using a plurality of applicator nozzles, having a metering apparatus and a distribution apparatus arranged downstream of the metering apparatus for conveying and distributing a predeterminable volume of the adhesive to each of the applicator nozzles, and a warming apparatus for heating a warming medium for heating the adhesive, wherein the metering apparatus and the distribution apparatus are connected with each other by a conveying line containing an adhesive conduit, and wherein a plurality of feed lines containing the adhesive conduit lead from the distribution apparatus to the applicator nozzles, the improvement comprising: a closed loop of the warming medium, the closed loop starting at the warming apparatus (2) and routed via the distribution apparatus (3) and the feed lines (6) to the applicator nozzles (4) and returned via the feed lines (6) and the distribution apparatus (3) to the warming apparatus (2), and the distribution apparatus (3) having an upper element (30) and a lower element (32) for one of conducting the feed and respectively returning flow of the warming medium through and with a center element (31), arranged between the upper element (30) and the lower element (32), for passing the adhesive.

2. In the device in accordance with claim 1, wherein a plurality of warming conduits for feeding and returning the warming medium through the closed loop are provided in the distribution apparatus (3), the feed lines (6) and the applicator nozzles (4).

3. In the device in accordance with claim 2, wherein the upper element (30) and the lower element (32) of the distribution apparatus (3) each have, centered in an interior, a collection chamber (301, 321) for one of the feed and respectively the return flow of the warming medium, and a plurality of warming conduits (302, 322) leading radially outward from the collection chamber (301, 321), and a collection conduit (300, 320) axially leading out of the collection chamber (301, 321) to an outside facing away from the center element (31), and the warming conduits of the feed lines (6) can be connected to the warming conduits (302, 322), and one of the feed and respectively the return flow of the warming apparatus (2) can be connected to the collection conduit (300, 320).

4. In the device in accordance with claim 2, wherein the upper element (30) and the lower element (32) of the distribution apparatus (3) are designed to appropriately match each other.

5. In the device in accordance with claim 2, wherein the center element (31) of the distribution apparatus (3) has a distribution chamber (312) for the adhesive, which is centered in an interior, and a plurality of distribution conduits (313) leading radially outward from the distribution chamber (312), and a feed conduit (311) leading radially from the outside into the distribution chamber (312), and the adhesive conduits of the feed lines (6) can be connected to the distribution conduits (313), and the adhesive conduit of a conveying tube (7) can be connected to the feed conduit (311).

6. In the device in accordance with claim 2, wherein the upper element (30) and the lower element (32) of the distribution apparatus (3) have a plurality of warming conduits (302, 322) corresponding to a respective number of the distribution conduits (313) of the center element (31), and the warming conduits (302, 322) and the distribution conduits (313) are congruently arranged when viewed in an axial direction of the distribution apparatus (3), and a plurality of fastening bores (304, 315, 324) for the connection of the upper element (30), the center element (31) and lower element (32) of the distribution apparatus (3) are formed between adjoining ones of the warming conduits and the distribution conduits.

7. In the device in accordance with claim 2, wherein the distribution apparatus (3) is cylindrically designed, the upper element (30), the center element (31) and the lower element (32) respectively form a cylinder section and are arranged axially above each other and can be connected with each other for achieving a good heat transfer to the center element (31) conducting the adhesive from one of the upper element (30) and respectively the lower element (32) through which one of the feed and respectively the return flow passes.

8. In the device in accordance with claim 7, wherein the upper element (30) and the lower element (32) of the distribution apparatus (3) each have, centered in an interior, a collection chamber (301, 321) for one of the feed and respectively the return flow of the warming medium, and a plurality of warming conduits (302, 322) leading radially outward from the collection chamber (301, 321), and a collection conduit (300, 320) axially leading out of the collection chamber (301, 321) to an outside facing away from the center element (31), and the warming conduits of the feed lines (6) can be connected to the warming conduits (302, 322), and one of the feed and respectively the return flow of the warming apparatus (2) can be connected to the collection conduit (300, 320).

9. In the device in accordance with claim 8, wherein the upper element (30) and the lower element (32) of the distribution apparatus (3) are designed to appropriately match each other.

10. In the device in accordance with claim 9, wherein the center element (31) of the distribution apparatus (3) has a distribution chamber (312) for the adhesive, which is centered in an interior, and a plurality of distribution conduits (313) leading radially outward from the distribution chamber (312), and a feed conduit (311) leading radially from the outside into the distribution chamber (312), and the adhesive conduits of the feed lines (6) can be connected to the distribution conduits (313), and the adhesive conduit of a conveying tube (7) can be connected to the feed conduit (311).

11. In the device in accordance with claim 10, wherein the upper element (30) and the lower element (32) of the distribution apparatus (3) have a plurality of warming conduits (302, 322) corresponding to a respective number of the distribution conduits (313) of the center element (31), and the warming conduits (302, 322) and the distribution conduits (313) are congruently arranged when viewed in an axial direction of the distribution apparatus (3), and a plurality of fastening bores (304, 318, 324) for the connection of the upper element (30), the center element (31) and lower element (32) of the distribution apparatus (3) are formed between adjoining ones of the warming conduits and the distribution conduits.

12. In the device in accordance with claim 11, wherein the feed lines (6) respectively have an adhesive conduit (63), a warming conduit (61) for passing the feed flow, and a warming conduit (62) for passing the return flow of the warming medium, and a heat-insulating envelope (60) enclosing the adhesive conduit (63) and the warming conduits (61, 62), wherein the warming conduits (61, 62) are arranged to extend in a spiral around the adhesive conduit (63).

13. In the device in accordance with claim 12, wherein each one of the applicator nozzles (4) comprise a housing, the housing has an inlet for the adhesive and a plurality, of first conduits for the adhesive at least one of leading and branching to at least one outlet opening (4a), and has a plurality, of second conduits with an inlet and an outlet for the passage of the warming medium.

14. In the device in accordance with claim 13, wherein a housing of the applicator nozzle (4) is formed in two sections as two housing elements (40, 41), wherein the conduits for passing the adhesive with inlet and outlet openings (4*a*) are formed in one of the housing elements (40), and the conduits for the passage of the warming medium with an inlet and outlet are formed in an other of the housing elements (41).

15. In the device in accordance with claim 13, wherein a plurality of outlet nozzles (4*a*) for the adhesive are provided in one of the applicator nozzles (4).

16. In the device in accordance with claim 15, wherein a housing of the applicator nozzle (4) is formed in two sections as two housing elements (40, 41), wherein the conduits for passing the adhesive with inlet and outlet openings (4*a*) are formed in one of the housing elements (40), and the conduits for the passage of the warming medium with an inlet and outlet are formed in an other of the housing elements (41).

17. In the device in accordance with claim 16, wherein the conveying tube (7) has an adhesive conduit (73) and respectively at least one warming conduit (71, 72) for passing one of the feed and respectively the return flow of the warming medium, and the warming conduits (71, 72) extend in a spiral shape around the adhesive conduit (73) and are enclosed in a common heat-insulating envelope (70).

18. In the device in accordance with claim 17, wherein respectively two of the warming conduits (71, 72) pass one of the feed flow and respectively the return flow of the warming medium and extend in a spiral shape around the adhesive conduit (73).

19. In the device in accordance with claim 18, wherein a plurality of spacers are provided between the warming conduits (72) of the feed line (7) which are arranged in a spiral shape around the adhesive conduit (73).

20. In the device in accordance with claim 19, wherein the feed line (7) with the warming conduits (71, 72) is integrated into the closed loop of the warming medium.

21. In the device in accordance with claim 20, wherein the warming conduits (71, 72) of the feed line (7) pass one of the feed flow and respectively the return flow of the warming medium between the warming apparatus (2) and the distribution apparatus (3).

22. In the device in accordance with claim 21, wherein the closed loop for the warming medium is conducted through all elements of the device which are used for conveying the adhesive so that the closed loop is formed starting at the warming apparatus (2) and routed via the metering apparatus (1), the conveying line (7), the distribution apparatus (3) and the feed lines (6) to the applicator nozzles (4), and then returned via the feed lines (6), the distribution apparatus (3), the conveying line (7) and the metering apparatus (1) to the warming apparatus (2).

23. In the device in accordance with claim 1, wherein the distribution apparatus (3) is cylindrically designed, the upper element (30), the center element (31) and the lower element (32) respectively form a cylinder section and are arranged axially above each other and can be connected with each other for achieving a good heat transfer to the center element (31) conducting the adhesive from one of the upper element (30) and respectively the lower element (32) through which one of the feed and respectively the return flow passes.

24. In the device in accordance with claim 1, wherein the feed lines (6) respectively have an adhesive conduit (63), a warming conduit (61) for passing the feed flow, and a warming conduit (62) for passing the return flow of the warming medium, and a heat-insulating envelope (60) enclosing the adhesive conduit (63) and the warming conduits (61, 62), wherein the warming conduits (61, 62) are arranged to extend in a spiral around the adhesive conduit (63).

25. In the device in accordance with claim 1, wherein each one of the applicator nozzles (4) comprise a housing, the housing has an inlet for the adhesive and a plurality of first conduits for the adhesive at least one of leading and branching to at least one outlet opening (4*a*), and has a plurality of second conduits with an inlet and an outlet for the passage of the warming medium.

26. In the device in accordance with claim 25, wherein a plurality of outlet nozzles (4*a*) for the adhesive are provided in one of the applicator nozzles (4).

27. In the device in accordance with claim 1, wherein the conveying tube (7) has an adhesive conduit (73) and respectively at least one warming conduit (71, 72) for passing one of the feed and respectively the return flow of the warming medium, and the warming conduits (71, 72) extend in a spiral shape around the adhesive conduit (73) and are enclosed in a common heat-insulating envelope (70).

28. In the device in accordance with claim 27, wherein respectively two of the warming conduits (71, 72) pass one of the feed flow and respectively the return flow of the warming medium and extend in a spiral shape around the adhesive conduit (73).

29. In the device in accordance with claim 28, wherein a plurality of spacers are provided between the warming conduits (72) of the feed line (7) which are arranged in a spiral shape around the adhesive conduit (73).

30. In the device in accordance with claim 1, wherein the feed line (7) with a plurality of warming conduits (71, 72) is integrated into the closed loop of the warming medium.

31. In the device in accordance with claim 30, wherein the warming conduits (71, 72) of the feed line (7) pass one of the feed flow and respectively the return flow of the warming medium between the warming apparatus (2) and the distribution apparatus (3).

32. In the device in accordance with claim 1, wherein the closed loop for the warming medium is conducted through all elements of the device which are used for conveying the adhesive so that the closed loop is formed starting at the warming apparatus (2) and routed via the metering apparatus (1), the conveying line (7), the distribution apparatus (3) and the feed lines (6) to the applicator nozzles (4), and then returned via the feed lines (6), the distribution apparatus (3), the conveying line (7) and the metering apparatus (1) to the warming apparatus (2).

* * * * *